(12) United States Patent
Flannery (10) Patent No.: US 7,868,919 B2
(45) Date of Patent: Jan. 11, 2011

(54) CONTROL SYSTEM FOR ALLOWING AN OPERATOR TO PROPORTIONALLY CONTROL A WORK PIECE

(75) Inventor: Mark Flannery, New South Wales (AU)

(73) Assignee: Honeywell Limited, New South Wales (AU)

( * ) Notice: Subject to any disclaimer, the term of this patent is extended or adjusted under 35 U.S.C. 154(b) by 1249 days.

(21) Appl. No.: 10/484,556

(22) PCT Filed: Jul. 26, 2002

(86) PCT No.: PCT/AU02/01001

§ 371 (c)(1),
(2), (4) Date: Jan. 21, 2004

(87) PCT Pub. No.: WO03/013128

PCT Pub. Date: Feb. 13, 2003

(65) Prior Publication Data

US 2004/0189802 A1     Sep. 30, 2004

(30) Foreign Application Priority Data

Jul. 27, 2001  (AU) .................................... PR6678

(51) Int. Cl.
H04N 5/232  (2006.01)
(52) U.S. Cl. ............. 348/211.8; 348/211.7; 348/211.13
(58) Field of Classification Search ............. 348/211.7, 348/211.12, 211.13, 211.8, 143; 715/834, 715/838
See application file for complete search history.

(56) References Cited

U.S. PATENT DOCUMENTS

| | | | | |
|---|---|---|---|---|
| 4,816,988 A | | 3/1989 | Yamanaka | |
| 4,945,367 A | * | 7/1990 | Blackshear | 396/427 |
| 5,406,307 A | * | 4/1995 | Hirayama et al. | 715/800 |
| 5,515,099 A | * | 5/1996 | Cortjens et al. | 348/14.1 |
| 5,664,132 A | * | 9/1997 | Smith | 715/834 |
| 5,872,922 A | * | 2/1999 | Hogan et al. | 709/204 |

(Continued)

FOREIGN PATENT DOCUMENTS

DE   19531213   2/1997

(Continued)

OTHER PUBLICATIONS

Derwent, Abstract Accession No. 2001-044128/06, JP2000305003A (Fuji Photo Optical Co Ltd) Nov. 2, 2000.

(Continued)

*Primary Examiner*—Jason Chan
*Assistant Examiner*—Gary C Vieaux (57) ABSTRACT

A control system (1) includes a work piece, such as a camera (2), having an adjustable functionality (3). A configuration device is associated with the work piece and is responsive to one or more control signals (7), the configuration device affects one or more selective adjustments to the adjustable functionality (3). Further included is an input device, such as a mouse (11), for generating one or more input signals (13) in response to one or more predetermined manual inputs (15) from an operator (9). Also a controller (21) is included for providing the control signals (7), the controller (21) being implemented in a graphical user environment and being responsive to the impute signals (13) such that the selective adjustments made to the adjustable functionality (3) are substantially proportional.

15 Claims, 2 Drawing Sheets

U.S. PATENT DOCUMENTS

| | | | |
|---|---|---|---|
| 6,097,371 A * | 8/2000 | Siddiqui et al. | 345/164 |
| 6,346,962 B1 * | 2/2002 | Goodridge | 348/14.05 |
| 6,400,401 B1 * | 6/2002 | Morino et al. | 348/211.1 |
| 6,424,410 B1 * | 7/2002 | Pelosi | 356/139.03 |
| 6,452,628 B2 * | 9/2002 | Kato et al. | 348/333.12 |
| 6,515,689 B1 * | 2/2003 | Terashima | 715/856 |
| 6,517,207 B2 * | 2/2003 | Chapman | 352/243 |
| 6,690,412 B1 * | 2/2004 | Higo | 348/143 |
| 6,696,977 B2 * | 2/2004 | Thompson et al. | 340/905 |
| 6,727,919 B1 * | 4/2004 | Reder et al. | 715/810 |
| 6,867,798 B1 * | 3/2005 | Wada et al. | 348/143 |
| 6,903,765 B1 * | 6/2005 | Takagi et al. | 348/211.4 |
| 6,940,544 B2 * | 9/2005 | Shimaoka et al. | 348/211.7 |
| 7,154,544 B2 * | 12/2006 | Kowno et al. | 348/240.99 |
| 7,245,287 B2 * | 7/2007 | Hinckley et al. | 345/156 |

FOREIGN PATENT DOCUMENTS

| | | |
|---|---|---|
| EP | 0 278 421 | 11/1991 |
| EP | 474234 A2 * | 3/1992 |
| EP | 1 033 879 | 9/2000 |
| GB | 2 252 473 | 8/1992 |
| WO | WO95/11566 | 4/1995 |
| WO | WO97/31482 | 8/1997 |

OTHER PUBLICATIONS

Derwent, Abstract Accession No. 1999-485759/41, JP11205653A (Canon KK) Jul. 30, 1999.

Derwent, Abstract Accession No. 98-354368/31, JP10136246A (Canon KK) May 22, 1998.

* cited by examiner

CONTROL SYSTEM FOR ALLOWING AN OPERATOR TO PROPORTIONALLY CONTROL A WORK PIECE

BACKGROUND TO THE INVENTION

The invention relates to a control system and in particular to a control system and method for allowing an operator to proportionally control a work piece.

The invention has been developed primarily for remotely controlling a camera, such as its orientation—pan and tilt—and zoom functions, and will be described hereinafter with reference to that application. It will be appreciated, however, that the invention is not limited to that particular field of use, and that the invention is also applicable to local control of a camera and other work pieces.

DISCUSSION OF THE PRIOR ART

It is known to control analogue closed circuit television (hereafter "CCTV") cameras remotely in applications such as security or surveillance systems. Such applications allow efficient use of available personnel and equipment.

The images captured by CCTV cameras are usually provided to an operator on a monitor at a location remote from the camera. Additionally, the cameras are controlled by the operator to ensure the displayed images are optimised for the circumstances. For example, if an alarm condition is present at a particular location, the operator may choose to view a specific entry point at that location.

An analogue joystick is the most frequently employed means for controlling CCTV cameras. For example, these joysticks are generally manipulated manually by the operator to pan a camera across a given arc. In this way, the operator moves the joystick to affect a movement of the camera that, in turn, changes the image displayed to the operator.

With the advent of networked digital video systems, some attempts have been made to control CCTV cameras via a digitised interface. To date, these attempts have not met widespread success as operators seem to have demonstrated a preference for joystick control. Unfortunately, this preference often produces a cumbersome working environment wherein some system functionality is initiated through the joystick, while other system functionality is initiated through other input devices. Such input devices may include a keyboard, a mouse, or other pointing devices.

Any discussion of the prior art throughout the specification should in no way be considered as an admission that such prior art is widely known or forms part of common general knowledge in the field.

DISCLOSURE OF THE INVENTION

It is an object of the present invention to overcome or ameliorate at least one of the disadvantages of the prior art, or to provide a useful alternative.

According to a first aspect of the invention there is provided a control system including:
a work piece having an adjustable orientation;
a configuration device that is associated with the work piece and which is responsive to control signals for affecting selective adjustments to the orientation;
an input device for generating input signals in response to predetermined manual inputs from an operator; and
a controller that is implemented in a graphical user environment, the controller being responsive to the input signals for providing the control signals such that the adjustments made to the orientation are substantially proportional.

According to a second aspect of the invention there is provided a control system including:
a camera for providing a first signal representative of a video sequence that has been captured by the camera;
a configuration device that is associated with the camera and which is responsive to control signals for affecting selective adjustments to at least one of;
a) the pan of the camera;
b) the tilt of the camera; and
c) the zoom effect provided by the camera;
an input device for generating input signals in response to predetermined manual inputs from an operator; and
a controller that is implemented in a graphical user environment, the controller being responsive to the input signals for providing the control signals such that the adjustments made are substantially proportional.

According to a third aspect of the invention there is provided a control system for allowing an operator to proportionally control a work piece that is responsive to control signals for affecting selective adjustments to its orientation, the system including:
an input device for generating input signals in response to predetermined manual inputs from the operator; and
a controller that is implemented in a graphical user environment, the controller being responsive to the input signals for providing the control signals such that the adjustments made to the orientation are substantially proportional.

According to a fourth aspect of the invention there is provided a control system for allowing an operator to proportionally control a camera that provides a first signal representative of a video sequence that has been captured by the camera, the camera being responsive to control signals for affecting selective adjustments to at least one of;
a) the pan of the camera;
b) the tilt of the camera; and
c) the zoom effect provided by the camera;

wherein the system includes:
an input device for generating input signals in response to predetermined manual inputs from the operator; and
a controller that is implemented in a graphical user environment, the controller being responsive to the input signals for providing the control signals such that the adjustments made are substantially proportional.

According to a fifth aspect of the invention there is provided a method for allowing an operator to proportionally control a work piece, the method including:
providing the work piece with an adjustable orientation;
being responsive to control signals for affecting selective adjustments to the orientation;
generating input signals in response to predetermined manual inputs of the operator to an input device; and
implementing a controller in a graphical user environment, the controller being responsive to the input signals for providing the control signals such that the adjustments made to the orientation are substantially proportional.

According to a sixth aspect of the invention there is provided a method for allowing an operator to proportionally control a camera, the method including:
locating the camera for providing a first signal representative of a video sequence that has been captured by the camera;

being responsive to control signals for affecting selective adjustments to at least one of;
a) the pan of the camera;
b) the tilt of the camera; and
c) the zoom effect provided by the camera;
generating input signals in response to predetermined manual inputs of the operator to an input device; and
implementing a controller in a graphical user environment, the controller being responsive to the input signals for providing the control signals such that the adjustments made are substantially proportional.

According to a seventh aspect of the invention there is provided a method for allowing an operator to proportionally control a work piece that is responsive to control signals for affecting selective adjustments to its orientation, the method including:
generating input signals in response to predetermined manual inputs of the operator to an input device; and
implementing a controller in a graphical user environment, the controller being responsive to the input signals for providing the control signals such that the adjustments made to the orientation are substantially proportional.

According to an eighth aspect of the invention there is provided a method for allowing an operator to proportionally control a camera that provides a first signal representative of a video sequence that has been captured by the camera, the camera being responsive to control signals for affecting selective adjustments to at least one of;
a) the pan of the camera;
b) the tilt of the camera; and
c) the zoom effect provided by the camera;

wherein the method includes:
generating input signals in response to predetermined manual inputs of the operator to an input device; and
implementing a controller in a graphical user environment, the controller being responsive to the input signals for providing the control signals such that the adjustments made are substantially proportional.

According to a ninth aspect of the invention there is provided a control system including:
a work piece having an adjustable functionality;
a configuration device that is associated with the work piece and which is responsive to control signals for affecting selective adjustments to the functionality,
an input device for generating input signals in response to predetermined manual inputs from an operator; and
a controller that is implemented in a graphical user environment, the controller being responsive to the input signals for providing the control signals such that the adjustments made to the functionality are substantially proportional.

Preferably, the work piece is a camera and the functionality is the zoom function of the camera. More preferably, the work piece has a plurality of adjustable functionalities and the configuration device, the input device and the controller allow selective substantially proportional adjustments of those functionalities. More preferably, the functionality is the orientation of the work piece. That is, the operator is able to selectively orientate the camera as well as zoom to a specific target, all via proportional controls.

According to a tenth aspect of the invention there is provided a method of controlling a work piece, the method including:
providing a work piece having an adjustable functionality;
being responsive to control signals for affecting selective adjustments to the functionality;
generating input signals in response to predetermined manual inputs from an operator; and
implementing a controller in a graphical user environment, the controller being responsive to the input signals for providing the control signals such that the adjustments made to the functionality are substantially proportional.

According to an eleventh aspect of the invention there is provided a control system for allowing an operator to proportionally control a camera that provides a first signal representative of a video sequence that has been captured by the camera, the camera being responsive to control signals for affecting selective adjustments to at least one of;
a) the pan of the camera;
b) the tilt of the camera; and
c) the zoom effect provided by the camera;

wherein the system includes:
a display having a viewing area, the display being responsive to the first signal for displaying the video sequence to the operator in the viewing area;
an input device for generating input signals in response to predetermined manual inputs from the operator; and
a controller that is implemented in a graphical user environment that includes the viewing area, the controller being responsive to the input signals for moving a cursor about the viewing area and for providing the control signals such that the adjustments made are substantially proportional.

According to a twelfth aspect of the invention there is provided a method for allowing an operator to proportionally control a camera that provides a first signal representative of a video sequence that has been captured by the camera, the camera being responsive to control signals for affecting selective adjustments to at least one of;
a) the pan of the camera;
b) the tilt of the camera; and
c) the zoom effect provided by the camera;

wherein the method includes:
providing a display having a viewing area, wherein the display is responsive to the first signal for displaying the video sequence to the operator in the viewing area;
generating input signals in response to predetermined manual inputs from the operator; and
implementing a controller in a graphical user environment that includes the viewing area, the controller being responsive to the input signals for moving a cursor about the viewing area and for providing the control signals such that the adjustments made to the orientation are substantially proportional.

Preferably, the input device includes a hand operable computer-pointing device and the controller includes:
a local processor for both operating a Graphical User Interface (hereafter "GUI") and for generating the control signals;
a display, such as a monitor, having a viewing area. The display is responsive to the local controller for displaying within the viewing area both the GUI and a cursor. The cursor is movable about the viewing area in response to the input signals.

Accordingly, the GUI provides the operator with graphical and immediate feedback on the nature of the control signals that are being generated by the inputs that he or she has provided. In other words, the GUI provides an immediate feedback loop for the operator while also providing proportional control.

Preferably also, the GUI includes an image area. The local controller is preferably responsive to the first signal for representing the video sequence in the image area. More preferably, the first signal is a live video feed. In some embodiments the first signal has a frame rate of 25 frames/sec. However, in other embodiments, different frame rates are used.

In a preferred form, the positioning of the cursor on the image area by the operator corresponds to one of a plurality of pre-selected commands. Each of the pre-selected commands corresponds to at least one control signal. More preferably, the local controller is responsive to the cursor's position, and to an actuation signal being provided by the operator, via the input device or otherwise. In this way, the control signal generated by the controller includes data indicative of the pre-selected commands. Even more preferably, the image area includes a plurality of adjacent regions that correspond to the respective commands.

In some embodiments the visual representation of the cursor varies in response to the region that the cursor overlies. However, in other embodiments the visual representation of the cursor remains constant and the GUI includes a separate graphical indicator of the command that corresponds to the cursor location. In further embodiments, use is made of both.

Preferably, the local controller and the configuration device are remote from each other and the control signals and the first signals are relayed via a network. More preferably, the network is an intranet or the Internet. In some embodiments the network is at least in part wireless.

In a preferred form, the input device includes a mouse. However, in other embodiments the input device is another computer based pointing device such as a track ball or a touch screen.

BRIEF DESCRIPTION OF THE DRAWINGS

Preferred embodiments of the invention will now be described, by way of example only, with reference to the accompanying drawings in which.

DETAILED DESCRIPTION OF THE INVENTION

Figure 1:
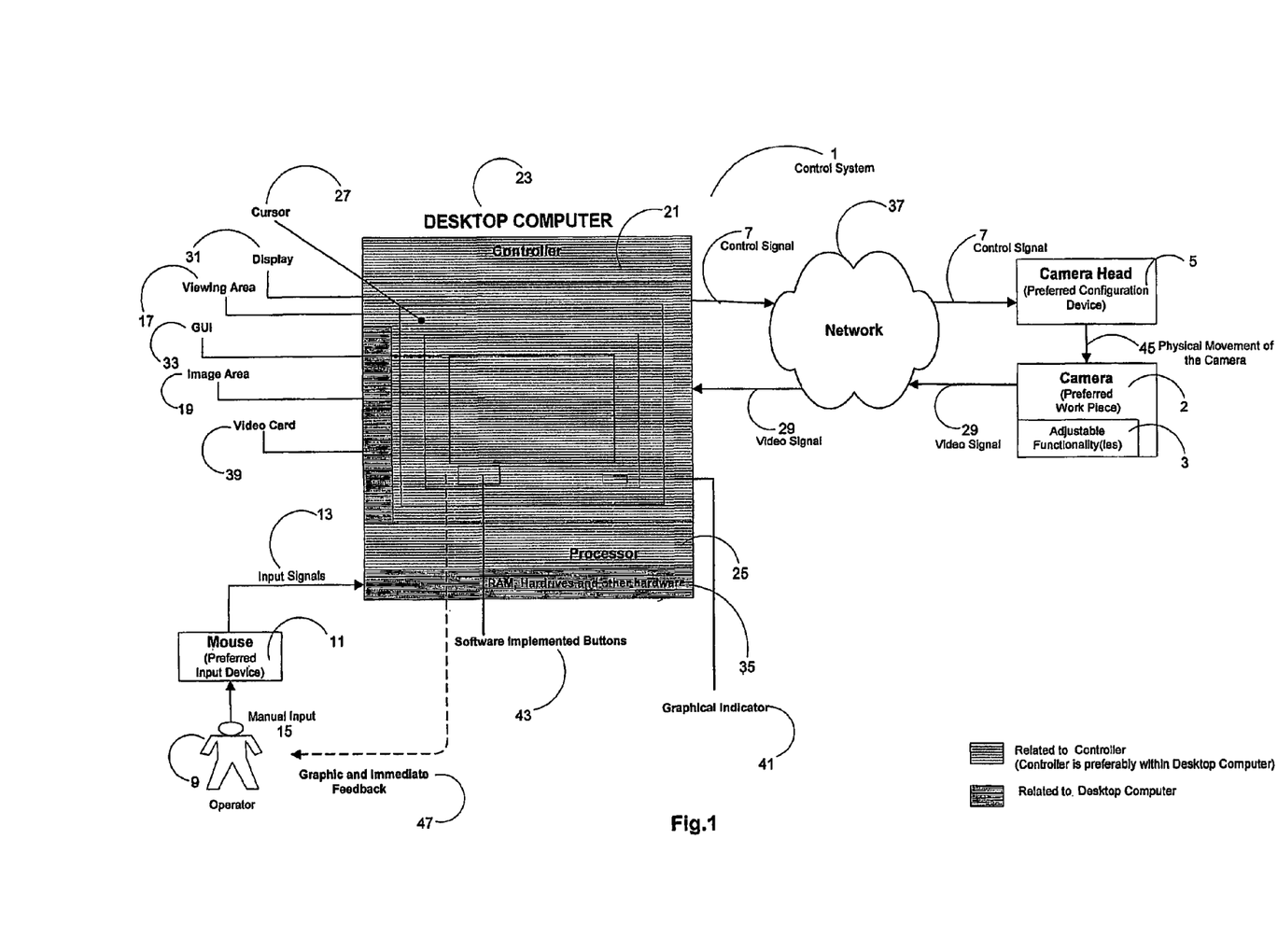
FIG. 1 is a schematic representation of a control system according to the invention.

Referring to FIG. 1, there is illustrated a control system 1 for allowing an operator 9 to proportionally control a work piece in the form of a pan/tilt/zoom (hereafter "PTZ") camera 2.

1. MAJOR COMPONENTS OF THE PREFERRED EMBODIMENT 1.1 A Camera and its Adjustable Functionalities, and a Configuration Device As shown in FIG. 1, a camera 2 is the preferred work piece. It will be evident to those skilled in the art based on the teachings herein that there are numerous possible work pieces that may be used.

The camera 2 is capable of continuous movement. That is, it is able to continuously pan (move in a horizontal plane) and/or continuously tilt (move in a vertical plane). In some embodiments, the camera 2 does not perform both operations simultaneously. Preferably, however, simultaneous panning/tilting (simultaneous movement in two planes) is accommodated.

The camera 2 has one or more adjustable functionalities 3. The adjustable functionalities 3 relate to the camera's 2 orientation (pan and tilt) and the camera's 2 ability to zoom. It will be evident to those skilled in the art based on the teachings herein that orientation and zoom are examples of numerous adjustable functionalities 3 that may be adjusted on a camera, or other work pieces. Further, it will be readily known that such adjustments may be made to the camera, or work piece, without the assistance of a configuration device as an intermediary.

Additionally, the camera 2 has other adjustable functionalities 3 which include the degree of magnification provided by its lens (the zoom effect). These adjustable functionalities 3 are selectively adjustable by the operator 9 through use of an input device such as a mouse 11, as will be described in more detail below.

In some embodiments, the camera 2 has, as a default, an auto focus function. Preferably, however, the operator 9 is provided with the ability to selectively override that default.

A configuration device in the form of a camera head 5 is associated with the camera 2. The configuration device communicates with the camera 2 by sending a "physical movement of the camera" signal 45. The camera head 5 is responsive to one or more control signals 7, preferably corresponding to PTZ commands, for affecting selective adjustments to the camera's 2 orientation and zoom capabilities.

1.2 An Input Device

In the preferred embodiment, the input device is preferably the mouse 11. The mouse 11 generates input signals 13 in response to predetermined manual inputs 15 from the operator 9 such that there is a relationship between the operator's 9 movements and the input signals 13 generated. However, in other embodiments the input device is another computer based pointing device such as a track ball or a touch screen. Accordingly, there is a relationship between the operator's 9 movements of the mouse 11 and the movements of a cursor 27 in a control window, such as a viewing area 17 or an image area 19.

By "predetermined" manual inputs 15, it is merely meant predetermined relative to the input device. For instance, a mouse is typically designed such that rolling it on a mouse pad yields a relatively comparable movement of a cursor on a screen. (Conversely, tapping a finger on many portions of the mouse—other than the buttons of course—may yield no effect.)

1.3 A Controller 1.3.1 The Controller is Responsive to Input Signals and Provides Control Signals A controller 21 is implemented in a graphical user environment provided by a local desktop computer's 23 processor 25. The controller 21 within the computer 23 is responsive to the input signals 13 and provides the control signals 7 such that the adjustments made to the camera's orientation and/or zoom are substantially proportional.

By proportional control it is meant that the rate of a change of the work piece, such as the rate at which the camera 2 sweeps through an arc, is dependent upon the virtual spacing of the cursor 27 or other pointer in the control window, such as the viewing area 17 or the image area 19. That is, the operator 9 perceives a proportionality between the predetermined hand movements he or she makes with respect to the input device, such as the mouse 11, and the consequent change in orientation and/or zoom of the camera 2.

1.3.2 The Controller is Responsive to Video Signals

The controller 21 in the computer 23 is also responsive to a video signal 29 provided by the camera 2. Accordingly, the controller 21 is at least partially responsible for representing an image reflective of the video signal 29 in the display's image area 19.

In this embodiment, the video signal 29 is a live video feed from the camera 2 that is delivered at a frame rate of 25 frames/sec. In other embodiments, different frame rates are used depending upon the bandwidth of the connections of a network 37 and the other network 37 traffic.

1.4 A Display, Viewing Area, GUI, and Image Area

A display 31, such as a monitor, includes the viewing area 17. If the work piece is something other than the camera 2, the viewing area 17 would preferably represent a 3D rendered model of the work piece. For example, the 3D model would show the work piece oriented appropriately, and instead of the video signals 29 coming back from the camera 2, rotational and positional information about the work piece would be received. Other viewing area options will be evident to those skilled in the art based on the teachings herein.

The display 31 is responsive to the local controller 21. Further, it displays within the viewing area 17 a graphical user interface (GUI) 33 and a cursor 27. The cursor 27 is movable about the viewing area 17 in response to the input signals 13. The operator 9 affects movement of the cursor 27 about or across the viewing area 17 by use of the mouse 11.

The GUI 33 provides the operator 9 with a graphical and immediate feedback 47 on the nature of the control signals 7 being generated by the input signals 13 provided via the mouse 11. In other words, the GUI 33 provides the graphical and immediate feedback 47 for the operator 9.

Figure 2:
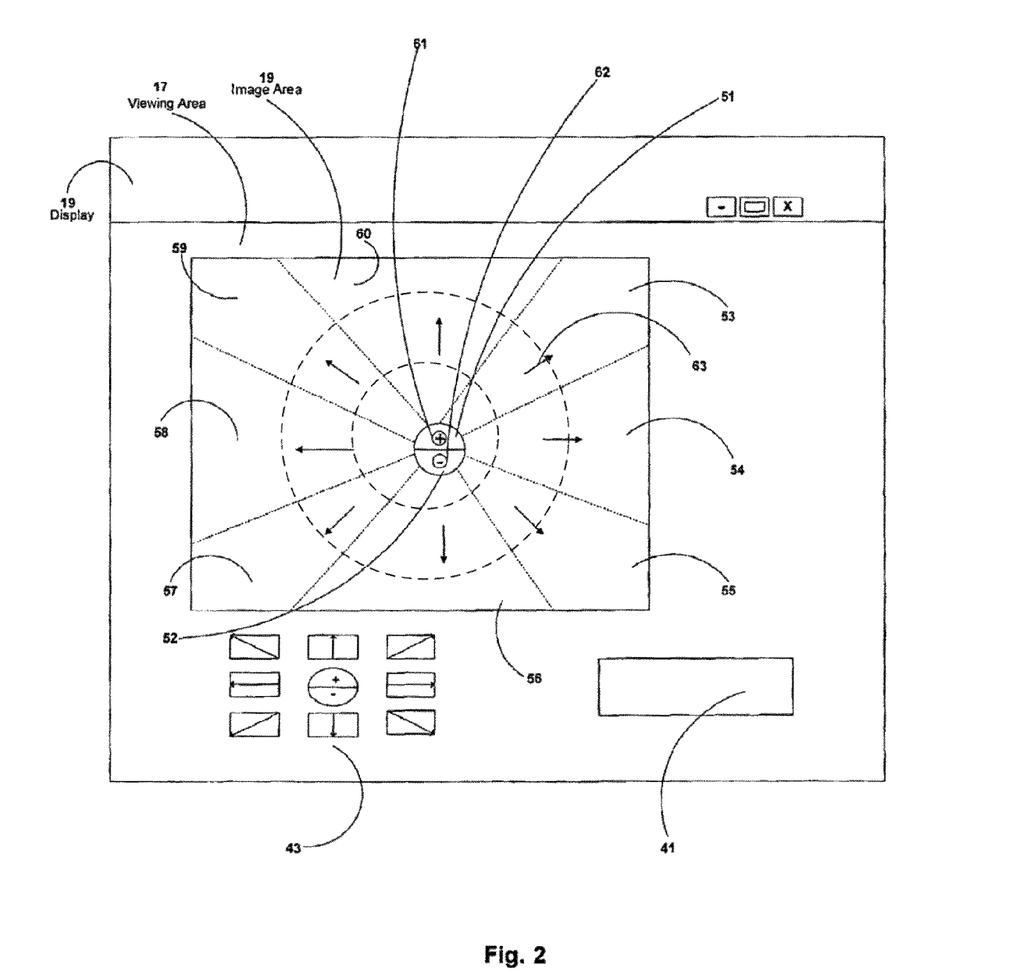
FIG. 2 is a representation of a display according to the invention.

As best shown in FIG. 2, the GUI 33 preferably includes a rectangular image area 19 that corresponds to a video sequence captured by a CCTV camera. The size of image area 19 is adjustable by the operator 9. In this embodiment, the image area 19 is included in the GUI 33 window that is opened, closed, minimised, maximised, or otherwise manipulated at a software level as required.

The position of the cursor 27 on the image area 19, or the viewing area 17 in other embodiments, corresponds to one of a plurality of pre-selected commands. The commands correspond to the control signals 7. Since the controller 21 is responsive to the cursor's 27 position, the control signal 7 generated includes data indicative of, or reflective of, the commands. The controller 21 is also responsive to an actuation signal provided by the operator 9.

The image area 19 also includes a plurality of regions 51 to 60 on which the cursor 27 is positioned. Preferably, those regions 51 to 60 are adjacent. The regions 51 to 60 correspond to one or more pre-selected commands, or control signals 7.

Further, it will be evident to those skilled in the art based on the teachings herein that there are numerous ways to configure such (adjacent) regions 51 to 60. Accordingly, various region shapes and sizes could be employed and adjusted for various purposes.

In this embodiment, regions 53 to 60 overlie the video sequence represented in the image area 19. The image being presented in the image area 21 by the controller 21. In some embodiments, graphical information, such as the regions' boundaries, is superimposed upon the image. Preferably, this is done in ghosted form to allow the operator 9 to observe the image completely. More preferably, the "ghosting" is toggled on and off, as required, by the operator 9.

In other embodiments, the regions 51 to 60 and the image area 19 are located spatially apart. Preferably, these separate areas are contained within the GUI 33 window.

1.5 A Computer

As will be evident to those skilled in the art based on the teachings herein, the computer 23 includes a processor 25, RAM, hard drives and other hardware 35 to allow the operation of the GUI 33. The GU environment in which the GUI 33 runs is a Microsoft® Windows™ environment. However, in other environments use is made of the Linux operating system or a specially developed proprietary system.

The computer 23 receives input signals 13 from the mouse 11. Further, the display 31, such as a monitor, is connected to a video card 39 associated with the computer 23. The monitor displays the GUI 33 and other information to the operator 9.

1.6 Visual Representation of the Cursor

As the operator 9 moves the mouse 11 so that the cursor 27 overlies one of the regions 53 to 60, the visual representation of the cursor 27 varies to provide further feedback to the operator 9. Each region in FIG. 2 includes an illustration of the representation of the cursor 27 provided to the operator 9 when that cursor 27 is placed over it.

For example, in regions 51 and 52, the cursor 27 is represented as a magnifying glass with a "+" 61 and a "−" 62 respectively. The cursor 27 retains the shape of the "+" 61 when the camera 2 is zooming forward, and retains the shape of the "−" 62 when it is reverse zooming. For instance, if the user starts the cursor 27 in region 51 and drags the cursor 27 to region 60, the cursor 27 remains as the "+" 61. As soon as the cursor 27 is dragged into a reverse zoom region, such as 52 or 56, it will change its configuration so that it is the "−" 62.

With regard to panning and/or tilting, the cursor 27 takes the form of an elongated arrow 63. The arrow's 63 direction corresponds to at least one of the predetermined orientation commands.

It will be evident to those skilled in the art based on the teachings herein that the cursor 27 may take on numerous configurations, shapes, and/or sizes. It will also be readily known that the cursor 27 could be made to reflect at least one of: the adjustable functionality 3 presently being adjusted, the input signal 13, the control signal 7 being sent to the configuration device, the control signal 7 associated with the region in which the cursor 27 is presently located, the rate which the work piece is to perform a specific adjustable functionality 3, and the adjustment to the rate at which the work piece is performing a specific adjustable functionality 3. In other embodiments the visual representation of the cursor 27 remains constant.

The GUI 33 also includes a separate graphical indicator 41 of the command corresponding to the cursor location. In this embodiment, the operator 9 receives feedback from both the cursor 27 and the separate graphical indicator 41, the separate graphical indicator 41 being located within the GUI 33 window.

1.7 The Software Implemented Buttons

An array of software implemented buttons 43 is also preferably included in the GUI 33 window. These buttons 43 allow the operator 9 to select commands corresponding to those associated with regions 51 to 60. Accordingly, the operator 9 has the choice of a proportional control, as provided by regions 51 to 60, or stepwise control as provided by buttons 43.

2. ZOOMING, PANNING, TILTING, PANNING/TILTING

2.1 Zooming

Region 51 and region 52 correspond to a forward zoom command and a reverse zoom command respectively. When the cursor 27 is placed over a region, as explained above, the cursor 27 assumes a predetermined visual configuration. Accordingly, the operator 9 receives a visual indication of the command associated with the cursor's 27 position. To initiate the command, the operator 9 places the cursor 27 over the desired region and clicks the left button of the mouse 11. The control signal 7 corresponding to the relevant command is then sent to the camera head 5, and the zoom of the camera 2 is adjusted accordingly. The respective zooming will continue until the button is released or the camera reaches its zooming limit.

The rate of change of the zoom is dependent upon the position of the cursor 27 within the image area 19. For example, when the operator 9 clicks and holds the left mouse button in region 51, the rate of zoom increase is preferably relatively slow. If the operator 9 wishes to increase his rate of zoom, the cursor 27 is moved upwardly in the image area 19.

Preferably, the upper half of the image area 19 relates to forward zooming and the bottom half of the image area 19 relates to reverse zooming. More preferably, the rate of forward zoom will increase as the cursor 27 is dragged away from the center of the image area 19. Reverse zooming is analogous relative to the bottom half of the image area 19. Further, it will also be appreciated in this example that sideways progression of the mouse 11 is ignored. Thus, in addition to utilizing the familiar "click and drag" functionality, the added functionality and benefit of proportional control is obtained.

Since the rate of zoom change is dependent on the cursor's 27 position, the zoom rates (and, any other adjustable functionality 3 rate associated with the camera 2, or any other work piece) are tailored to best fit various specific applications. Preferably, this is achieved by further dividing the image area 19 into a configurable number of concentric circles emanating from the center of the image area 19. Although the exact number of circles is not crucial, the number of circles is preferably greater than four.

Preferably, the distance between each circle is substantially identical, with the space between each circle representing a specific speed of camera movement (that is, either panning, tilting, panning/tilting, or zooming). It will be evident to those skilled in the art based on the teachings herein that the spacing between the circles can vary in alternate embodiments.

The speed change is ideally linear from 0 to 99, and the edge of the largest—most outer—circle is preferably reserved for a "turbo" speed (supported by most camera heads). Accordingly, the speed of zooming will increase as the cursor moves outwardly from the center of the image area 19. It will be evident to those skilled in the art based on the teachings herein that the speed change associated with each circle may be non-linear in nature in alternate embodiments. In fact, other tuning options relating to the rates, sizes, and shapes associated with the regions 51 to 60 within the image area 19 may readily be achieved in light of teachings disclosed herein.

So long as the left mouse button is depressed, the computer 23's controller 21 will continue to respond to movements of the cursor 27 to affect changes to the zoom provided by the camera 2. Accordingly, if the cursor 27 is progressed into the bottom half of image area 19, then the zoom effect will be reversed. (As described in Section 3, in other embodiments, movement of the cursor 27 from one region to a "different" region will result in no action.) Completely analogous to forward zooming, the rate of reversal will be dependent upon the positioning of the cursor 27.

2.2 Panning

The placement of the cursor 27 over regions 54 or 58 affects the respective right and left pan commands for camera 2. The direction of the pan is relative to the present orientation of the camera 2. For instance, if the operator 9 wishes to view an image to the left of the image presently being obtained by the camera 2, the cursor 27 is placed over region 58 and the left mouse button pressed.

Analogous to the zooming description above, the rate at which the camera 2 pans to the left will depend on the position of the cursor 27 within regions 54 or 58. That is, the closer that the cursor 27 lies to the center of the image area 19, the slower the panning will preferably occur. The panning, tilting, and pan/tilting functions do not utilize regions 51 or 52. These two regions preferably relate to zooming exclusively.

The panning rates are tailored to best fit various specific applications. Preferably, this is achieved by further dividing the image area 19 into a configurable number of concentric circles emanating from the center of the image area 19. Although the exact number of circles is not crucial, the number of circles is preferably greater than four.

Preferably, the distance between each circle is substantially identical, with the space between each circle representing a specific speed of camera movement (that is, either panning, tilting, panning/tilting, or zooming). It will be evident to those skilled in the art based on the teachings herein that the spacing between the circles can vary in alternate embodiments.

The speed change is ideally linear from 0 to 99, and the edge of the largest—most outer—circle is preferably reserved for a "turbo" speed (supported by most camera heads). Accordingly, the speed of panning will increase as the cursor moves outwardly from the center of the image area 19. As with the zoom function, the rate of panning is varied by utilising the click and drag functionality. That is, by moving the cursor within regions 54 or 58 while keeping the left mouse button depressed. It will be evident to those skilled in the art based on the teachings herein that the speed change associated with each circle may be non-linear in nature in alternate embodiments. In fact, other tuning options relating to the rates, sizes, and shapes associated with the regions 51 to 60 within the image area 19 may readily be achieved in light of teachings disclosed herein.

2.3 Tilting

The operation of the cursor 27 over regions 56 and 60 is identical to the description for regions 54 and 58, with the exception that the movement of the cursor 27 will affect the rate at which tilting occurs. Accordingly, the placement of the cursor 27 over regions 56 and 60 affects the respective down and up tilt commands for the camera 2, and the direction of the tilt being relative to the present orientation of the camera 2.

The click and drag functionality is once again provided. As with the panning and zooming functions, the rate of tilting is varied dynamically by the operator 9 simply by utilising the click and drag functionality. That is, by moving the cursor within regions 56 and/or 60 keeping the left mouse button depressed.

The tilting rates are tailored to best fit various specific applications. Preferably, this is achieved by further dividing the image area 19 into a configurable number of concentric circles emanating from the center of the image area 19. Although the exact number of circles is not crucial, the number of circles is preferably greater than four.

Preferably, the distance between each circle is substantially identical, with the space between each circle representing a specific speed of camera movement (that is, either panning, tilting, panning/tilting, or zooming). It will be evident to those skilled in the art based on the teachings herein that the spacing between the circles can vary in alternate embodiments.

The speed change is ideally linear from 0 to 99, and the edge of the largest—most outer—circle is preferably reserved for a "turbo" speed (supported by most camera heads). Accordingly, the speed of tilting will increase as the cursor moves outwardly from the center of the image area 19. It will be evident to those skilled in the art based on the teachings herein that the speed change associated with each circle may be non-linear in nature in alternate embodiments. In fact, other tuning options relating to the rates, sizes, and shapes associated with the regions 51 to 60 within the image area 19 may readily be achieved in light of teachings disclosed herein.

2.4 Panning/Tilting

The operation of the cursor 27 over regions 53, 55, 57 and 59 is also analogous to the description set forth regarding regions 54 and 58, except that the movement of the cursor 27 will affect the rate at which panning/tilting occurs.

The placement of the cursor 27 over regions 53, 55, 57 and 59 affects a pre-selected combination of pan and tilt commands for the camera 2. In this embodiment, equal amounts of pan and tilt are automatically affected, regardless of where the cursor 27 lies within a respective region. That is, by virtue of the pre-selected default weighting, the camera 2 will move at 45° relative to the predefined pan and tilt axes.

In other embodiments, the default weighting may be adjusted by the operator 9. In addition, the relative pan/tilt weighting may be dependent upon the specific location of the cursor 27 within a respective region.

The panning/tilting rates are tailored to best fit various specific applications. Preferably, this is achieved by further dividing the image area 19 into a configurable number of concentric circles emanating from the center of the image area 19. Although the exact number of circles is not crucial, the number of circles is preferably greater than four.

Preferably, the distance between each circle is substantially identical, with the space between each circle representing a specific speed of camera movement (that is, either panning, tilting, panning/tilting, or zooming). It will be evident to those skilled in the art based on the teachings herein that the spacing between the circles can vary in alternate embodiments.

The speed change is ideally linear from 0 to 99, and the edge of the largest—most outer—circle is preferably reserved for a "turbo" speed (supported by most camera heads). Accordingly, the speed of panning/tilting will increase as the cursor moves outwardly from the center of the image area 19. It will be evident to those skilled in the art based on the teachings herein that the speed change associated with each circle may be non-linear in nature in alternate embodiments. In fact, other tuning options relating to the rates, sizes, and shapes associated with the regions 51 to 60 within the image area 19 may readily be achieved in light of teachings disclosed herein.

3. HOW TRANSITIONING BETWEEN REGIONS IMPACTS PANNING, TILTING, AND PANNING/TILTING

Preferably, when the cursor 27 is moved from one region—with the left mouse button depressed—into a different region, the pan, tilt, or pan/tilt command should preferably change accordingly. For example, if the cursor 27 is moved from region 55 into region 56, the panning/tilting should preferably switch to simply tilting.

However, in other embodiments, movement of the cursor 27 from one region to a "different" region, with the left mouse button depressed, will result in no action. Rather, a new action is only initiated by releasing the left mouse button and depressing it in the "different" region. In both cases, the shape of the cursor 27 will also change so that the operator 9 will be provided with additional feedback.

4. CENTERING AN IMAGE BY "CLICKING"

If the mouse 11 is simply clicked—i.e. and not "held"—on any portion of regions 53 to 60, the camera 2 will be adjusted—via panning, tilting, or panning/tilting—so that the image area 19 will be centered, or substantially centered, at the location of the cursor click. The speed of the movement will preferably depend on where, relative to the center of the image area 19, the "click" is made and in which region the "click" was made.

5. NETWORK RELATED ISSUES

5.1 One Camera; One Computer 5.1.1 A Network

As illustrated in FIG. 1, the camera 2 and the camera head 5 are remote from the computer 23 and the control signals 7 and the video signals 29 are preferably relayed via a network 37. The network 37 in FIG. 1 is an intranet. However, the invention is also suitable for implementation with the Internet. In some embodiments, a network is not included. In other embodiments, however, there are other forms of networks used. Such other networks involve the employment of a DVM video server, and/or a video streamer, and/or other components that will be apparent to one skilled in the art. Further, in some embodiments the network is at least in part wireless.

5.1.2 Communication

The controller 21 in the computer 23 converts the input signals 13 provided by the mouse 11 into pan, tilt, pan/tilt, and/or zoom control signals 7. The control signals 7 are preferably transmitted via TCP/IP to the camera head 5. Further, the video signals 29 are also preferably transmitted via TCP/IP.

This networked configuration adopted for use with the preferred embodiment of the invention purposely utilises internet protocols (TCP/IP) to allow the operator 9 to control one or more cameras, whether that or those cameras are within the operator 9's (preferably local) network 37, within a company's intranet, or a remote site that is linked via the internet. That is, the preferred embodiment caters for the centralised monitoring of remote sites with fine control of camera position independent of the geographical location of the cameras.

5.2 A Plurality of Cameras; A Plurality of Computers

It will be evident to those skilled in the art based on the teachings herein as to how to expand the system to multiple cameras and/or multiple desktop computers. Further, it will be evident to those skilled in the art based on the teachings herein how to establish an operator hierarchy so that no two operators are able to affect simultaneous control of a single camera.

6. EXAMPLES

Some examples of the applications of the preferred embodiments follow.

6.1 Example 1

Site A is a shopping centre and the operator is responsible for maintaining a safe and secure environment.

In the event that a suspicious individual is detected on a loading dock by one of the cameras at Site A, the operator may adjust the camera's orientation and other functions to obtain instructive information on the display's image area. If the suspicious party decides to flee the scene, the operator is able to effectively "follow" the person by panning, and/or tilting the camera It is also possible to adjust the zoom of the camera to obtain a larger (or smaller) image of the person involved. If the suspect moves out of one camera's potential view or the operator wants to view the scene from a different view, the operator is able to select another of the cameras to continue the "following" the suspect. It will be evident to those skilled in the art based on the teachings herein as to how one camera can be chosen in this scenario.

In the event that the suspect has parked his vehicle in the that dock, the operator is able to zoom in to obtain greater detail about the vehicle, such as its make, model, registration number, or other information. With this greater detail, the operator is in a better position to make a public announcement requesting movement of that vehicle, to have the vehicle removed, or to report the situation accurately to the police, etc

6.2 Example 2

The control system 1 has been programmed to be specifically responsive to certain alarm triggers such that one or more cameras are automatically positioned into a predetermined orientation. That is, if a camera is not being actively controlled by an operator, the triggering of a predetermine alarm results in the camera panning, tilting, and/or zooming to a specific position so that a specific view is obtained.

For instance, if the alarm is triggered by the opening of a security door at a specific entry point, the camera may be automatically progressed to a set pan, tilt and zoom that allows an operator to view the entry point and any persons in the entry point. In some embodiments more than one camera is set in this way. For example, two cameras may be automatically positioned upon the alarm being activated controlled, one viewing each side of the entry point.

In the event that an operator is actively engaged in the control of a camera that is selected for automatic positioning following an alarm trigger, one of two events occur. Either:

A. The operator is overridden and the camera is progressed in accordance with the automatic settings. In this case, the operator is provided with a message, via the GUI that an override has occurred. Preferably, that message is a text message that overlies the image; or B. The operator is allowed to maintain, or obtain, control over the camera Preferably, however, the operator is also alerted to the alarm so that he or she can, when possible, take the necessary action to view the scene.

In some embodiments, whether an operator is overridden may depend upon the position the operator holds within a hierarchy.

6.3 Example 3

A camera is located within a manufacturing site and is used by an operator to view a step in the manufacture of a particular product.

In some cases like this one, the operator is responsible for not only affecting control of the camera, but also control of a manufacturing step. In other embodiments, the operator is also concerned with quality control. In fact, the invention is particularly well suited to industrial control applications in hazardous environments where it is typically safer for the operator to not be physically present to effect the desired operation.

With the added benefit of proportional control of the pan, tilt, pan/tilt, and/or zoom, the operator may quickly and conveniently control, with a single input device, not only the camera but also other functionality associated with the user interface like camera and video clip searching, process control, and supervision, word processing, etc.

It will be evident to those skilled in the art based on the teachings herein that alternate embodiments are numerous. For example, another embodiment of the control system includes: the work piece being responsive to the control signal; the GUI and the viewing area being responsive to the input signals; and, the controller being responsive to the graphical user interface. In this alternate embodiment, the control signal corresponds to at least one of: a new rate at which the adjustable functionality is to be performed by the work piece such that the adjustable functionality is adjusted according to the new rate; and, an adjustment to the rate at which the functionality is being performed by the work piece. Further, the GUI includes a cursor manoeuvrable on the viewing area, the cursor being responsive to the input signals, wherein the location of the cursor on the viewing area corresponds to at least one control signal. At least one section of the viewing area corresponds to at least one control signal, the correspondence between the section and the control signal being selectively modifiable such that the control signal corresponding to the section may be modified to be a different control signal. At least one of the following is selectively adjustable: the size of the section; and the shape of the section. More preferably, in this alternate embodiment, the work piece is a camera wherein the functionalities include at least one of: panning; tilting; zooming; and focusing. Further, the visual configuration of the cursor reflects at least one of: the new rate at which the functionality is to be performed by the work piece, the adjustment to the rate at which the functionality is being performed by the work piece, the input signal, the control signal, the location of the cursor on the display, the control signal associated with the location of the cursor on the display. Even more preferably, in this alternative embodiment, the viewing area corresponds to an image captured by the camera, the image being received by the controller as a video signal; wherein the control and the video signals are relayed via a network, the network including at least one of: an intranet, a WAN, and an Internet. Most preferably, in this alternate embodiment, the controller is a computer.

Although the invention has been described with reference to specific examples, it will be evident to those skilled in the art based on the teachings herein that it may be embodied in many other forms.

The invention claimed is:

1. A control system including:
   a camera for providing a first signal representative of a video sequence captured by the camera;
   a configuration device, associated with the camera, that is responsive to one or more control signals, the configuration device affecting one or more selective adjustments to the camera in terms of pan and tilt;
   an input device for generating one or more input signals in response to one or more predetermined manual inputs from an operator, wherein the input signals are indicative of a cursor position and a user designated command; and
   a controller for providing the control signals, the controller being implemented in a graphical user environment, the graphical user environment being configured to provide a graphical user interface for display to the user, the graphical user interface including:
      an image area for providing an image reflective of the first signal representative of a video sequence captured by the camera;
      a plurality of radial regions defined in the image area, separated by radial boundaries, diverging from a predefined common origin, wherein each radial region corresponds to a predefined adjustment operation in terms of pan, tilt, or a combination of pan and tilt;
      a plurality of concentric regions defined in the image area, separated by concentric boundaries that are centered around the predefined common origin in the image area, wherein each concentric region corresponds to a specific speed of camera movement in terms of pan, tilt, or a combination of pan and tilt;
   wherein the controller is responsive to the input signals such that, based upon the position of the cursor relative to the radial regions and concentric regions and the designated user command, the controller provides to the configuration device control signals that are indicative of:
      the predefined adjustment operation corresponding to the position of the cursor relative to the radial regions; and
      a specific speed of camera movement corresponding to the position of the cursor relative to the concentric regions,
   such that the camera performs a selective adjustment in accordance with that predefined adjustment operation and specific speed of camera movement, and wherein:
      in response to subsequent movement of the cursor across a concentric boundary a subsequent control signal is provided indicative of a different specific speed of camera movement thereby to affect a selective adjustment from a first non-zero rate of change to a second non-zero rate of change such that the rate of adjustments made to pan and/or tilt are substantially proportional with regard to the position of the cursor relative to the predefined origin in the image area; and
      wherein in response to a subsequent movement of the cursor across a radial boundary between a first radial region that corresponds to a first predefined adjustment operation in terms of pan movement, tilt movement, or a combination of pan movement and tilt movement, to a second radial region that corresponds to a second predefined adjustment operation in terms of pan movement, tilt movement, or a combination of pan movement and tilt movement, the second predefined adjustment operation being different from the first predefined adjustment operation, the camera changes from a selective adjustment in accordance with a first predefined adjustment operation to a selective adjustment in accordance with a second predefined adjustment operation;
   wherein, for each radial region that corresponds to a predefined adjustment operation in terms of a combination of pan movement and tilt movement, the relative pan/tilt weighting is dependent on the specific location of the cursor within the region;
   wherein the graphical user interface additionally includes one or more zoom functionality regions corresponding to zoom commands, these zoom functionality regions being centrally defined in the image area, and wherein the controller is responsive to the input signals such that, responsive to an input signal indicative of a user designated command and cursor position within one of these zoom functionality regions, the controller provides to the configuration device control signals that are indicative of:
      a zoom operation;
      a direction of zoom operation; and
      a specific speed of rate of change of zoom operation dependent on the position of the cursor within the image area; and
   wherein, during a zoom operation, dragging the cursor away from the center of the image area increases the rate of change of zoom operation, and dragging the cursor across a boundary between top and bottom halves of the image area reverses a direction of zoom operation.

2. A control system according to claim 1 wherein the controller, being responsive to the first signal, includes:
   a processor for operating a GUI and for providing the control signals, the GUI having an image area; and
   a display, having a viewing area, for displaying within the viewing area both the GUI and a cursor, the display being responsive to the controller such that an image reflective of the first signal is presented by the controller in the image area, and the cursor being movable about the viewing area in response to the input signals.

3. A control system according to claim 2 wherein the GUI provides the operator with a graphical and immediate feedback on the nature of the control signals being generated by the manual inputs from the operator.

4. A control system according to claim 3 wherein the first signal is a live video feed.

5. A control system according to claim 2, wherein a visual representation is associated with the cursor, the representation corresponding to the region over which the cursor lies.

6. A control system according to claim 5 wherein the GUI includes a separate graphical indicator of the command corresponding to the region over which the cursor lies.

7. A control system according to claim 1, wherein the controller and the configuration device are remote from each other, and the control signals are relayed via a network.

8. A control system according to claim 7 wherein the network is an intranet or an Internet or a WAN.

9. The control system of claim 1 wherein the visual representation of the cursor varies responsive to the position of the cursor within the image area, such that a first visual representation is provided when the cursor is within a region corresponding to a zoom command and a second visual representation is provided when the cursor is within another region of the image area other a region corresponding to a zoom command.

10. A method for allowing an operator to proportionally control a camera including:
    locating a camera for providing a first signal representative of a video sequence captured by the camera;
    being responsive to one or more control signals that affect one or more selective adjustments to the camera in terms of pan and tilt;
    generating one or more input signals in response to one or more predetermined manual inputs from an operator, wherein the input signals are indicative of a cursor position and a user designated command; and
    implementing a controller for providing the control signals, the controller being implemented in a graphical user environment, the graphical user environment being configured to provide a graphical user interface for display to the user, the graphical user interface including:
        an image area for providing an image reflective of the first signal representative of a video sequence captured by the camera;
        a plurality of radial regions defined in the image area, separated by radial boundaries, diverging from a predefined common origin, wherein each radial region corresponds to a predefined adjustment operation in terms of pan, tilt, or a combination of pan and tilt;
        a plurality of concentric regions defined in the image area, separated by concentric boundaries that are centered around the predefined common origin in the image area, wherein each concentric region corresponds to a specific speed of camera movement in terms of pan, tilt, or a combination of pan and tilt;
    wherein the controller, responsive to the input signals, based upon the position of the cursor relative to the radial regions and concentric regions and the designated user command, provides to the configuration device control signals that are indicative of:
        the predefined adjustment operation corresponding to the position of the cursor relative to the radial regions; and
        a specific speed of camera movement corresponding to the position of the cursor relative to the concentric regions;
    such that the camera performs a selective adjustment in accordance with that predefined adjustment operation and specific speed of camera movement, and wherein:
    in response to subsequent movement of the cursor across a concentric boundary a subsequent control signal is provided indicative of a different specific speed of camera movement thereby to affect a selective adjustment from a first non-zero rate of change to a second non-zero rate of change such that the rate of adjustments made to pan and/or tilt are substantially proportional with regard to the position of the cursor relative to the predefined origin in the image area; and
    wherein in response to a subsequent movement of the cursor across a radial boundary between a first radial region that corresponds to a first predefined adjustment operation in terms of pan movement, tilt movement, or a combination of pan movement and tilt movement, to a second radial region that corresponds to a second predefined adjustment operation in terms of pan movement, tilt movement, or a combination of pan movement and tilt movement, the second predefined adjustment operation being different from the first predefined adjustment operation, the camera changes from a selective adjustment in accordance with a first predefined adjustment operation to a selective adjustment in accordance with a second predefined adjustment operation; and
    wherein, for each radial region that corresponds to a predefined adjustment operation in terms of a combination of pan movement and tilt movement, the relative pan/tilt weighting is dependent on the specific location of the cursor within the region; and
    implementing the controller wherein the graphical user interface additionally includes one or more zoom functionality regions corresponding to zoom commands, these zoom functionality regions being centrally defined in the image area, and wherein the controller is responsive to the input signals such that, responsive to an input signal indicative of a user designated command and cursor position within one of these zoom functionality regions, the controller provides to the configuration device control signals that are indicative of:
        a zoom operation;
        a direction of zoom operation; and
        a specific speed of rate of change of zoom operation dependent on the position of the cursor within the image area; and
    wherein, during a zoom operation, dragging the cursor away from the center of the image area increases the rate of change of zoom operation, and dragging the cursor across a boundary between top and bottom halves of the image area reverses a direction of zoom operation.

11. A method according to claim 10 wherein the GUI includes:
    a viewing area, wherein at least one section of the viewing area corresponds to at least one control signal, the correspondence between the section and the control signal being selectively modifiable such that the control signal corresponding to the section may be modified to be a different control signal; and
    wherein the control signal generation corresponds to the section.

12. A method according to claim 11 wherein the GUI includes:
    a cursor maneuverable on the viewing area, the cursor being responsive to the input signals, wherein the location of the cursor on the viewing area corresponds to at least one control signal; and wherein the control signal generation corresponds to the location of the cursor.

13. A method according to claim 10 which further includes transmitting video signals from the camera to a computer that provides the graphical user environment such that the viewing area corresponds to an image captured by the camera.

14. A method according to claim 13 wherein the control and video signals are relayed via a network, the network including at least one of: an intranet, a WAN, and an Internet.

15. A method according to claim 10, wherein the controller is a computer.

* * * * *